United States Patent
Peric et al.

(10) Patent No.: US 8,976,906 B2
(45) Date of Patent: *Mar. 10, 2015

(54) METHOD FOR SPECTRUM SENSING OF MULTI-CARRIER SIGNALS WITH EQUIDISTANT SUB-CARRIERS

(75) Inventors: Sinisa Peric, Bethesda, MD (US); Thomas F. Callahan, III, Fredericksburg, VA (US)

(73) Assignee: QRC, Inc., Fredericksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,042

(22) Filed: Mar. 29, 2012

(65) Prior Publication Data

US 2013/0259171 A1 Oct. 3, 2013

(51) Int. Cl.
H04L 27/06 (2006.01)

(52) U.S. Cl.
USPC ............. 375/340; 370/336; 375/260; 455/91; 704/214; 704/220; 704/246

(58) Field of Classification Search
None
See application file for complete search history.

(56) References Cited

U.S. PATENT DOCUMENTS

| | | | |
|---|---|---|---|
| 5,365,592 A * | 11/1994 | Horner et al. | 704/250 |
| 5,436,847 A | 7/1995 | Schroer et al. | |
| 7,317,761 B2 | 1/2008 | Lozhkin | |
| 7,366,246 B2 | 4/2008 | Walker et al. | |
| 7,369,485 B2 | 5/2008 | Halford et al. | |
| 7,403,505 B2 | 7/2008 | Yoon et al. | |
| 7,430,257 B1 | 9/2008 | Shattil | |
| RE41,130 E * | 2/2010 | Fette et al. | 455/91 |
| 7,929,937 B2 | 4/2011 | Koivunen et al. | |
| 2008/0198948 A1 | 8/2008 | Tang | |
| 2009/0129493 A1 | 5/2009 | Zhang et al. | |
| 2009/0215390 A1 | 8/2009 | Ku et al. | |
| 2009/0279626 A1 | 11/2009 | Wang | |
| 2009/0290552 A1 | 11/2009 | Bertorelle | |
| 2009/0307540 A1 | 12/2009 | Razazian et al. | |
| 2010/0086074 A1 | 4/2010 | Chen et al. | |
| 2010/0142643 A1 | 6/2010 | Ueda et al. | |
| 2010/0202574 A1 | 8/2010 | Chen et al. | |

FOREIGN PATENT DOCUMENTS

| | | |
|---|---|---|
| CN | 101826889 | 9/2010 |
| KR | 20020016434 | 3/2002 |

OTHER PUBLICATIONS

Axell, Erik, et al., "Optimal and Sub-Optimal Spectrum Sensing of OFDM Signals in Known and Unknown Noise Variance." IEEE Journal on Selected Areas in Communications, vol. 29, No. 2, Feb. 2011, pp. 290-304.

Chen, Hou-Shin, et al., "Spectrum Sensing for OFDM Systems Employing Pilot Tones." IEEE Transactions on Wireless Communications, vol. 8, No. 12, Dec. 2009, pp. 5862-5870.

(Continued)

*Primary Examiner* — Adolf Dsuouza

(74) *Attorney, Agent, or Firm* — The Marbury Law Group, PLLC

(57) ABSTRACT

A multi-carrier signal is typically comprised of many equidistant sub-carriers. This results in periodicity of spectrum within the bandwidth of such a multi-carrier signal. An unknown multi-carrier signal with equidistant sub-carriers can thus be sensed together with its sub-carrier spacing by finding a discernible local maximum in the cepstrum (Fourier transform of the log spectrum) of the multi-carrier signal.

19 Claims, 4 Drawing Sheets

(56) References Cited

OTHER PUBLICATIONS

Bokharaiee, Simin, "Blind Spectrum Sensing for OFDM-Based Cognitive Radio Systems." IEEE Transactions on Vehicular Technology, vol. 60, No. 3, Mar. 2011, pp. 858-871.

Rui, Yun, "Frequency domain discrete fourier transform spread generalized multi-carrier system and its performance analysis." Computer Communications 32 (2009), pp. 456-464.

* cited by examiner

METHOD FOR SPECTRUM SENSING OF MULTI-CARRIER SIGNALS WITH EQUIDISTANT SUB-CARRIERS

BACKGROUND

The increasing demand for wireless services has placed a premium on the efficient use of RF spectrum. Many wireless protocols are designed around the concept that frequencies and channels may be reused by properly designed and managed systems. Re-use of spectrum creates the potential for signals of one system to interfere with signals of another.

Devices that use wireless services can also be required to evaluate various signals that are present at a particular location in order to detect and identify them, as well as find a piece of RF spectrum that is available for communication. Wireless devices may use various techniques, including spectrum analysis, to accomplish this task.

A multi-carrier signal is typically comprised of many equidistant sub-carriers. By way of illustration and not by way of limitation, a multi-carrier signal may include Orthogonal Frequency-Division Multiplex (OFDM) signals such as DAB, DVB-T/H, Wi-Fi (802.11a/g/n), WiMAX, LTE, and Discrete Multi Tone (DMT) signals such as ADSL G.992.1. Different multi-carrier signals typically have different sub-carrier distances and thus different spectrum periods within their bandwidth. Different multi-carrier signals also have different bandwidths. Detection of the signals can be done with prior knowledge of signal parameters, or without knowing them (blind detection).

Sensing whether a particular multi-carrier signal is present in a spectrum sample may be useful for RF network planning, RF network interference analysis, dynamic spectrum access (e.g. in cognitive radio), designing a wireless device capable of using the particular multi-carrier signal, and audio signal analysis.

SUMMARY

Embodiments are directed to sensing the presence, sub-carrier spacing, location, and identity of a multi-carrier signal with equidistant sub-carriers in a spectrum sample.

It is known that a multi-carrier signal is typically comprised of many equidistant sub-carriers. This characteristic of a multi-carrier signal results in periodicity of spectrum within the bandwidth of the multi-carrier signal. In various embodiments, this periodicity is exploited to sense, locate, and identify a multi-carrier signal in a spectrum sample.

In one embodiment, the presence of a multi-carrier signal with equidistant sub-carriers in a spectrum sample is sensed together with its sub-carrier spacing by finding a discernable local maximum in the cepstrum magnitude of a spectrum sample. The sensed sub-carrier spacing is then used to identify the multi-carrier signal.

In another embodiment, the presence of a multi-carrier signal with equidistant sub-carriers is sensed together with its sub-carrier spacing and location in the spectrum sample that is larger than a maximum expected signal spectrum bandwidth. The spectrum sample is divided into spectrum subsets, each of which is sufficiently large to include that maximum expected signal spectrum bandwidth. The subcarrier spacing and the location in the spectrum sample of the multi-carrier signal are sensed by finding a subset of the spectrum sample having the highest discernable local maximum in the cepstrum magnitude. The sensed sub-carrier spacing is then used to identify the multi-carrier signal.

In yet another embodiment, the presence of a multi-carrier signal with equidistant sub-carriers (having a known sub-carrier spacing and spectrum bandwidth) is sensed together with its location in the spectrum sample that is larger than its spectrum bandwidth. The spectrum sample is divided into spectrum subsets, each of which is sufficiently large to include that known spectrum bandwidth. The location in the spectrum sample of the multi-carrier signal is sensed by finding a subset of a spectrum sample with the maximum discernable magnitude of the cepstrum bin corresponding to the known sub-carrier spacing.

DETAILED DESCRIPTION

As used herein, the term "cepstrum" encompasses a result that is calculated using any of a variety of analytical tools. By way of illustration and not by way of limitation, the cepstrum may be calculated by performing a Fourier analysis of the signal magnitude spectrum, by applying a logarithmic function to the magnitude spectrum before performing the Fourier analysis, and by squaring the signal magnitudes before performing the Fourier analysis. The embodiments described herein do not rely on any particular analytical tool used to compute the cepstrum. For example, cepstrum magnitude or cepstrum squared magnitude can equally be used to acquire the cepstrum.

If the signal log magnitude spectrum contains many regularly spaced (periodic) harmonics, then the Fourier analysis of this spectrum will show a cepstrum magnitude peak corresponding to the spacing between the spectrum harmonics: i.e. the spectrum period, or fundamental frequency. A multi-carrier signal can be identified by the presence of a large magnitude "signal" in a cepstrum bin that represents the characteristic spectrum harmonics spacing of this multi-carrier signal.

Figure 1:
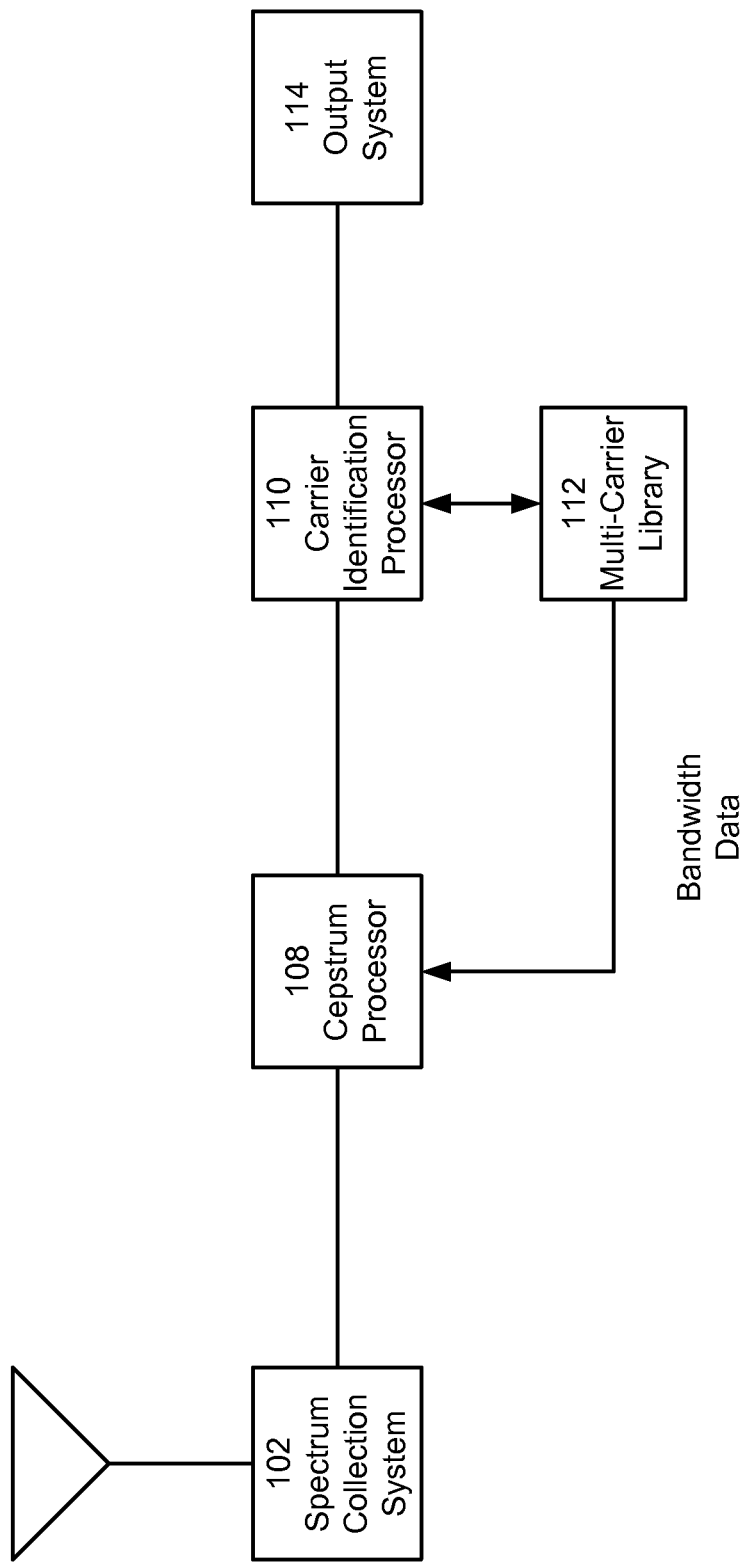
FIG. 1 is a block diagram illustrating a multi-carrier signal sensing system according to an embodiment.

A system 100 for sensing the presence of a multi-carrier signal with equidistant sub-carriers in spectrum sample is illustrated in FIG. 1. A spectrum collection system 102 collects a spectrum sample and provides the log magnitude of the spectrum data to the cepstrum processor 108, which employs Fourier transform to produce the cepstrum. By way of illustration and not by way of limitation, the spectrum collection system 102 may include a receiver, analog to digital converter, and a fast Fourier transform (FFT) processor to produce the spectrum. In other embodiments, such as where the multi-carrier signal sub-carrier spacing is known, the cepstrum processor 108 may be a discrete Fourier transform (DFT) processor that produces only the needed cepstrum components. In another embodiment, the cepstrum processor 108 may generate cepstrum for subsets of spectrum sample with different locations and bandwidths.

A carrier identification processor 110 receives the cepstrum bins from the cepstrum processor 108, and data from a multi-carrier library 112. Different multi-carrier signals typically have different sub-carrier distances and thus different spectrum periods within their bandwidth. Different multi-carrier signals also have different bandwidths. Particular multi-carrier signals can be discovered by sensing the presence of a spectrum period (cepstrum bin) specific to that particular multi-carrier signal within the subset of the spectrum sample having bandwidth specific to that particular multi-carrier signal. When the cepstrum bin with a large magnitude "signal" is found in the subset of the spectrum sample, location of this subset also indicates the location of the multi-carrier signal in the spectrum sample. In an embodiment, the multi-carrier library 112 identifies cepstrum bins that will have large magnitudes when a particular multi-carrier signal is present in a spectrum sample. In an embodiment, the multi-carrier library 112 provides bandwidth of a particular multi-carrier signal to the cepstrum processor 108 so that subsets of spectrum sample for which it generates cepstrum include this bandwidth.

The carrier identification processor 110 uses the results provided by the cepstrum processor 108, and information obtained from the library 112, to determine whether a particular multi-carrier signal is present in the spectrum sample. In an embodiment, the determination may be based on the presence of a signal within the specific cepstrum bin having a magnitude that exceeds a threshold value. In another embodiment, when a multi-carrier signal is sensed that is not identified in the library 112, the signal parameters may be stored in the library 112 to permit further analysis and possible identification.

In an embodiment, the carrier identification processor 110 may instruct the output system 114 to issue an alert when a multi-carrier signal is present in the spectral sample. Alternatively, the carrier identification processor 110 may be configured to instruct the output system 114 to issue an alert when a multi-carrier signal is not present in the spectral sample.

Figure 2:
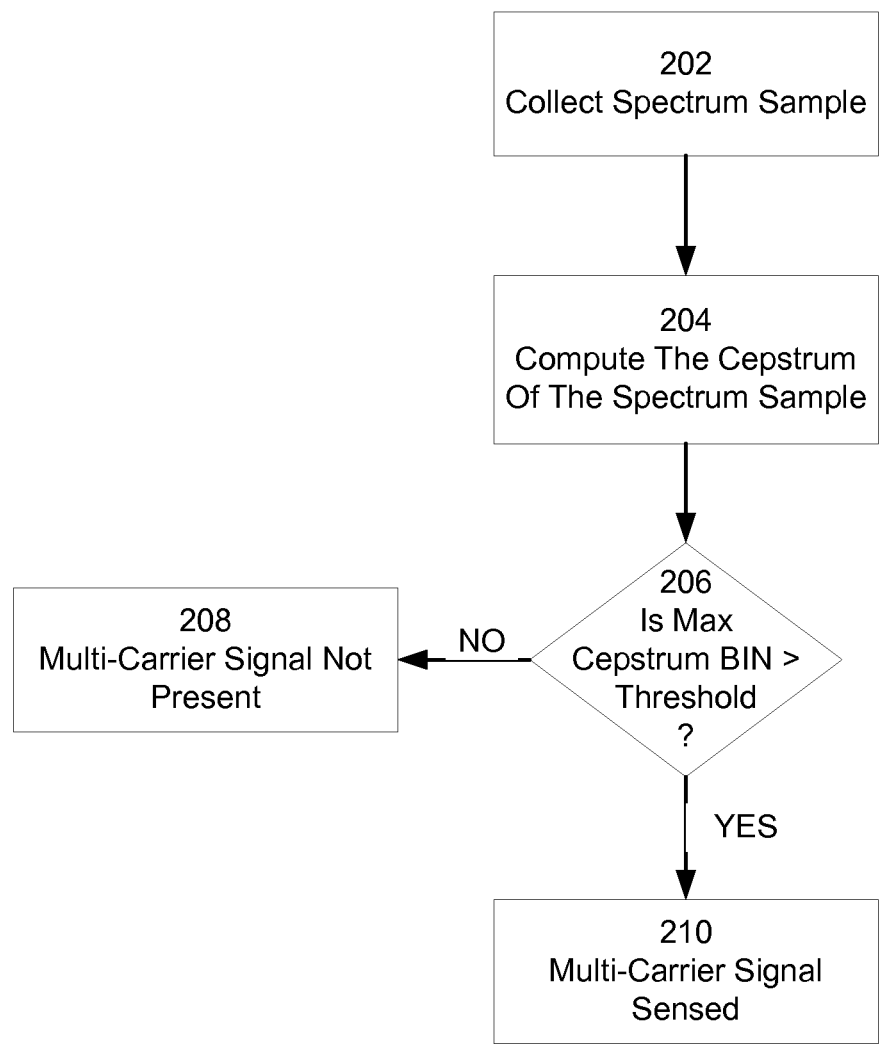
FIG. 2 is a flow diagram illustrating process for sensing a multi-carrier signal in a spectrum sample according to an embodiment.

FIG. 2 is a flow diagram illustrating process for sensing a multi-carrier signal with equidistant sub-carriers in a spectrum sample according to an embodiment. In an embodiment, the system 100 is used to accomplish this.

A spectrum sample of interest is collected first. (Block 202.) In an embodiment, the sample is acquired with the appropriate spectrum/frequency resolution for a minimum expected spectrum period of the multi-carrier signal.

The cepstrum of the spectrum sample is computed using a Fast Fourier Transform (FFT). (Block 204.) A determination is made whether the maximum cepstrum bin magnitude is above a predetermined threshold. (Block 206.) If the threshold is not met (that is, the answer to Block 206 is "NO"), then the determination is that the multi-carrier signal having a minimum spectrum period is not present in the spectrum sample. (Block 208.) If the threshold is met (that is, the answer to Block 206 is "YES"), then the determination is that the multi-carrier signal having a minimum spectrum period is present in the spectrum sample. (Block 210.) The cepstrum location of the maximum cepstrum bin indicates the sub-carrier spacing of the multi-carrier signal. As previously noted, the sub-carrier spacing of a multi-carrier signal may be used to identify the type of multi-carrier signal present.

In an embodiment, the threshold is selected to maximize the detection of weak multi-carrier signals, while minimizing the possibility of false detection due to noise or presence of other signals that might utilize a spectrum period smaller than the assumed minimum.

In an embodiment, the carrier identification processor 110 may instruct the output system 114 to issue an alert when a multi-carrier signal is present in the spectral sample. Alternatively, the carrier identification processor 110 may be configured to instruct the output system 114 to issue an alert when a multi-carrier signal is not present in the spectral sample.

Figure 3:
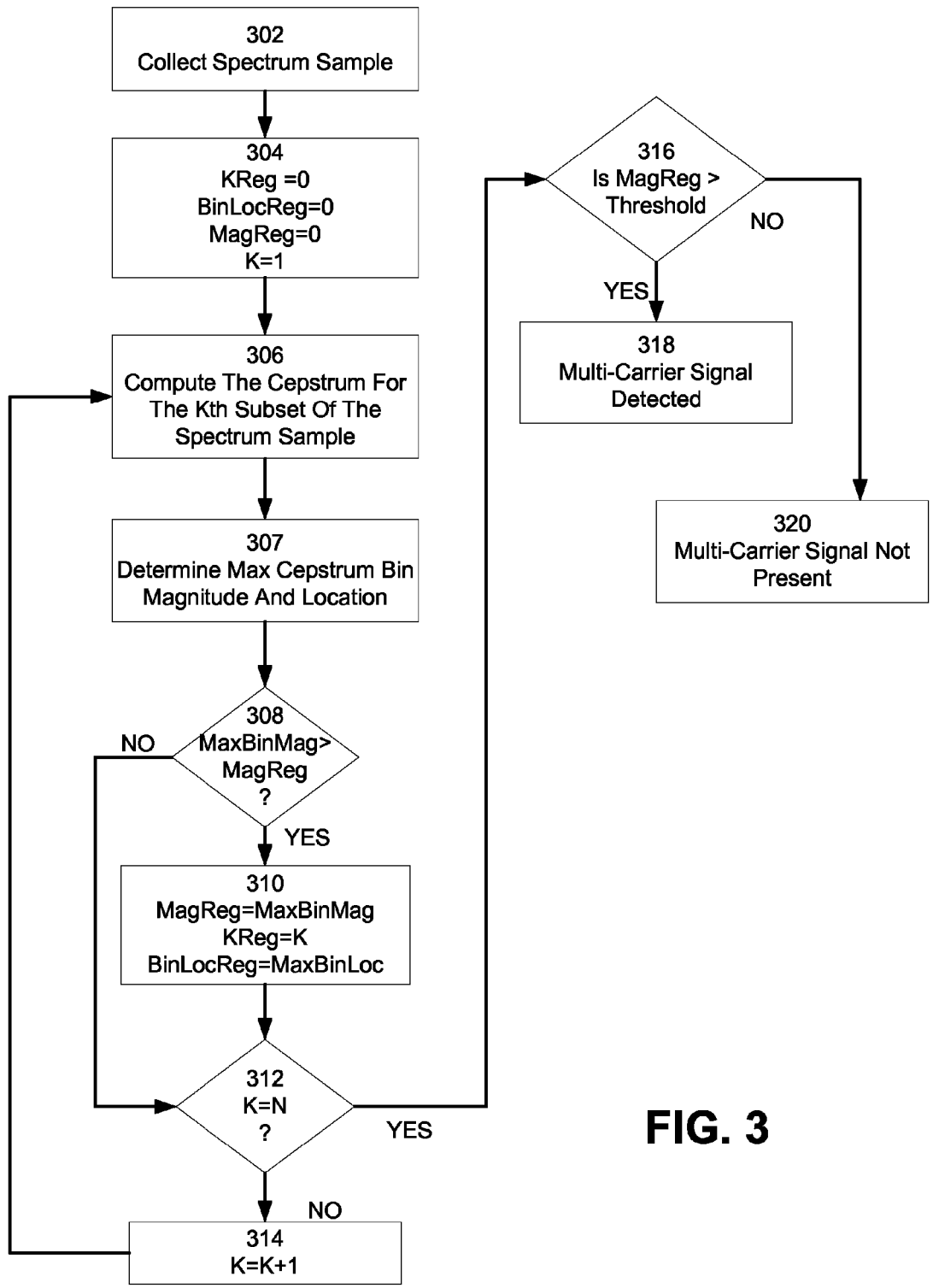
FIG. 3 is a flow diagram illustrating process for sensing a multi-carrier signal in a spectrum sample larger than a maximum expected signal spectrum bandwidth according to an embodiment.

FIG. 3 is a flow diagram illustrating a process for sensing a multi-carrier signal with equidistant sub-carriers in a spectrum sample larger than a maximum expected signal spectrum bandwidth according to an embodiment. In an embodiment, the system 100 is used to accomplish this.

A spectrum sample of interest is collected first. (Block 302.) In an embodiment, the sample is acquired with the appropriate spectrum/frequency resolution for a minimum expected spectrum period of a multi-carrier signal that is the object of the test. In an embodiment, "N" subsets of the spectrum sample are used for cepstrum computations. The subset bandwidth corresponds to the maximum expected bandwidth of the multi-carrier signal that is the object of the test. An iterative process is used to compute the cepstrum bins for each of the "N" subsets, and to identify the cepstrum bin having the maximum magnitude across all of the "N" subsets.

A sample subset counter "K" is set to 1, counter register (KReg) is set to 0, bin location register (BinLocReg) is set to 0, and a magnitude register (MagReg) is set to 0 (Block 304). The cepstrum of the spectrum sample subset K is computed using a Fast Fourier Transform (FFT) (Block 306). The cepstrum bin with maximum magnitude is recorded as MaxBinMag and its location as MaxBinLoc (Block 307). A determination is made whether the maximum cepstrum bin magnitude in the $K^{th}$ spectrum sample subset (MaxBinMag) is greater than the value of the magnitude register (MagReg). If MaxBinMag in the $K^{th}$ subset is greater than MagReg, that is, if the result of Block 308 is "YES," the value of MagReg is set to the value of MaxBinMag, the value of KReg is set to the value K, the value BinLocReg is set to the value MaxBinLoc (Block 310), and the process continues at Block 312. If MaxBinMag in the $K^{th}$ subset is not greater than MagReg, that is, if the result of Block 308 is "NO," the process continues at Block 312.

A determination is made whether the last $K^{th}$ subset is the $N^{th}$ subset (the last subset) (Block 312). If the last $K^{th}$ subset is not the $N^{th}$ subset, that is, if the result of Block 312 is "NO," the value of K is incremented by 1 (Block 314) and the process returns to Block 306. If the last $K^{th}$ subset is the $N^{th}$ subset that is, if the result of Block 312 is "YES," the process continues at Block 316.

A determination is made whether the value stored in MagReg is above a pre-determined threshold. (Block 316.) If the threshold is not met (that is, the answer to Block 316 is "NO"), then the determination is that a multi-carrier signal having a minimum spectrum period and a maximum spectrum bandwidth is not present in the tested subsets of the spectrum sample. (Block 320.) If the threshold is met (that is, the answer to Block 316 is "YES"), then the determination is that a multi-carrier signal is present at the KReg subset of the spectrum sample. (Block 318.) The recorded cepstrum location of the FFT bin with highest recorded magnitude (BinLocReg) indicates the sub-carrier spacing of the sensed multi-carrier signal. As previously noted, the sub-carrier spacing of a multi-carrier signal may be used to identify the type of multi-carrier signal present.

In an embodiment, the threshold is selected to maximize the detection of weak multi-carrier signals while minimizing the possibility of false detection due to noise or presence of other signals that might utilize spectrum period smaller than the assumed minimum.

In an embodiment, the carrier identification processor 110 may instruct the output system 114 to issue an alert when a multi-carrier signal is present in the spectral sample. Alternatively, the carrier identification processor 110 may be configured to instruct the output system 114 to issue an alert when a multi-carrier signal is not present in the spectral sample.

Figure 4:
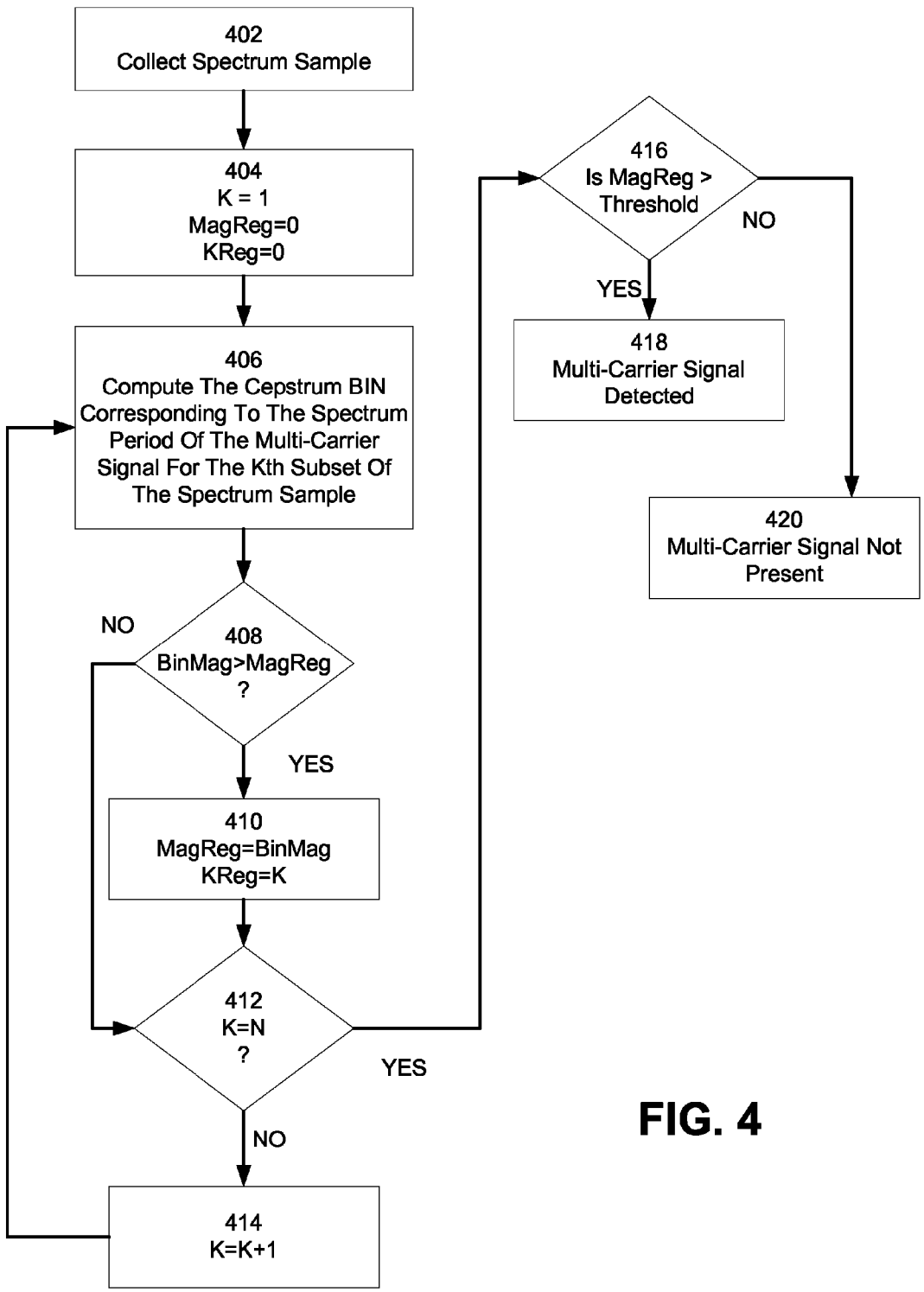
FIG. 4 is a flow diagram illustrating process for sensing a known multi-carrier signal in a spectrum sample larger than its spectrum bandwidth according to an embodiment.

FIG. 4 is a flow diagram illustrating process for sensing a multi-carrier signal with equidistant sub-carriers, having known a spectrum period and spectrum bandwidth, in a spectrum sample larger than its spectrum bandwidth according to an embodiment. In an embodiment, the system 100 is used to accomplish this. In this embodiment, because the spectrum period of the multi-carrier signal is known, the cepstrum bin that would indicate the presence of the signal is also known. Thus, the cepstrum processor (FIG. 1, 108) may be configured to perform a discrete Fourier transform on the spectrum sample to obtain only the cepstrum bin corresponding to the spectrum period of the multi-carrier signal that is the object of the test. Alternatively, the cepstrum processor (FIG. 1, 108) may be configured to perform a fast Fourier transform on the spectrum sample to identify all of the cepstrum bins of the spectrum sample, one of which is the bin corresponding to the spectrum period of the multi-carrier signal that is the object of the test.

A spectrum sample of interest is collected first. (Block 402.) In an embodiment, the sample is acquired with the appropriate spectrum/frequency resolution for the known spectrum period of a multi-carrier signal that is the object of the test. In an embodiment, "N" subsets of the spectrum sample are used for cepstrum computations. The subset bandwidth corresponds to the bandwidth of the known multi-carrier signal that is the object of the test. An iterative process is used to compute the cepstrum bin corresponding to the spectrum period of the known multi-carrier signal that is the object of the test for each of the "N" subsets, and to identify the spectrum subset having the maximum magnitude at the computed cepstrum bin.

A sample subset counter "K" is set to 1, counter register (KReg) is set to 0 and a magnitude register (MagReg) is set to 0, (Block 404). The cepstrum bin corresponding to the spectrum period of the multi-carrier signal of interest for the spectrum sample subset K is computed using a Discrete Fourier Transform (DFT) (Block 406). A determination is made whether the magnitude of this cepstrum bin in the $K^{th}$ spectrum sample subset (BinMag) is greater than the value of the magnitude register (MagReg). If BinMag in the $K^{th}$ subset is greater than MagReg, that is, if the result of Block 408 is "YES," the value of MagReg is set to the value of BinMag, the value of KReg is set to the value K (Block 410), and the process continues at Block 412. If BinMag in the $K^{th}$ subset is not greater than MagReg, that is, if the result of Block 408 is "NO," the process continues at Block 412.

A determination is made whether the last $K^{th}$ subset is the $N^{th}$ subset (the last subset) (Block 412). If the last $K^{th}$ subset is not the $N^{th}$ subset, that is, if the result of Block 412 is "NO," the value of K is incremented by 1 (Block 414), and the process returns to Block 406. If the last $K^{th}$ subset, is the $N^{th}$ subset that is, if the result of Block 412 is "YES," the process continues at Block 416.

A determination is made whether value stored in MagReg is above a pre-determined threshold. (Block 416.) If the threshold is not met (that is, the answer to Block 416 is "NO"), then the determination is that a multi-carrier signal, having a known spectrum period and spectrum bandwidth, is not present in the tested subsets of the spectrum sample. (Block 420.) If the threshold is met (that is, the answer to Block 416 is "YES"), then the determination is that a multi-carrier signal, having a known spectrum period and spectrum bandwidth, is present at the KReg subset of the spectrum sample. (Block 418.)

In an embodiment, the threshold is selected to maximize the detection of weak multi-carrier signals, while minimizing the possibility of false detection due to noise or presence of other signals that might utilize the same or similar spectrum period.

In an embodiment, the carrier identification processor 110 may instruct the output system 114 to issue an alert when a multi-carrier signals with known spectrum period and spectrum bandwidth is present in the spectral sample. Alternatively, the carrier identification processor 110 may be configured to instruct the output system 114 to issue an alert when a multi-carrier signal with known spectrum period and spectrum bandwidth is not present in the spectral sample.

The foregoing method descriptions and the process flow diagrams are provided merely as illustrative examples and are not intended to require or imply that the blocks of the various embodiments must be performed in the order presented. As will be appreciated by one of skill in the art, the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an," or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The receiving and analyzing of signals required by certain embodiments may be performed by one or more devices or systems of devices. The functionality of the electronic hardware used to implement the analytical processes in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function, in one or more exemplary aspects, the functions described may be implemented in hardware, software, firmware, or any combination thereof.

If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media includes both computer storage media and communication media, including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Additionally, the operations of a method or algorithm may reside as one or any combination, or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein, but is to be accorded the widest scope consistent with the following claims and the principles and novel features disclosed herein.

What is claimed is:

1. A processor-implemented method for sensing a presence of a multi-carrier signal with equidistant sub-carriers in a spectral sample, the method comprising:
    obtaining by a spectral sample collection system a spectrum sample;
    transforming by a cepstrum processor the spectrum sample to obtain a cepstrum;
    determining by a carrier identification processor a bin location within the cepstrum having a maximum bin magnitude;
    determining by the carrier identification processor whether the maximum bin magnitude at the cepstrum bin location exceeds a predetermined threshold; and
    issuing by the carrier identification processor an alert that the multi-carrier signal has been sensed in the spectrum sample in response to determining that the maximum bin magnitude at the cepstrum bin location exceeds the predetermined threshold, wherein the cepstrum bin location of the maximum bin magnitude indicates a sub-carrier spacing of the multi-carrier signal when it is determined that the maximum bin magnitude exceeds the predetermined threshold.

2. The method of claim 1, further comprising identifying a type of multi-carrier signal from the sub-carrier spacing.

3. The method of claim 1, wherein the multi-carrier signal is selected from the group consisting of an Orthogonal Frequency-Division Multiplex (OFDM) signal, a Wi-Fi (802.11a/g/n) signal, a WiMAX signal, an LTE signal, and a Discrete Multi Tone (DMT) signal.

4. The method of claim 1, further comprising issuing by the carrier identification processor an alert that the multi-carrier signal has not been sensed in the spectrum sample in response to determining that the maximum bin magnitude at the cepstrum bin location does not exceed the predetermined threshold.

5. The method of claim 1, wherein the multi-carrier signal has a minimum sub-carrier spacing.

6. The method of claim 5, further comprising issuing by the carrier identification processor an alert that the multi-carrier signal having the minimum sub-carrier spacing has not been sensed in the spectrum sample in response to determining that the maximum bin magnitude at the cepstrum bin location does not exceed the predetermined threshold.

7. The method of claim 5, further comprising issuing by the carrier identification processor an alert that the multi-carrier signal having the minimum sub-carrier spacing has been sensed in the spectrum sample in response to determining that the maximum bin magnitude at the cepstrum bin location exceeds the predetermined threshold.

8. A processor-implemented method for sensing a presence of a multi-carrier signal with equidistant sub-carriers in a spectral sample, the method comprising:
    obtaining by a spectrum collection system a spectrum sample, wherein the spectrum sample is larger than a maximum expected signal spectrum bandwidth;
    obtaining by a cepstrum processor from the spectrum sample a plurality of spectrum subsets, wherein each spectrum subset in the plurality of spectrum subsets has a bandwidth that is approximately equal to the maximum expected signal spectrum bandwidth;
    transforming by the cepstrum processor each of the plurality of spectrum subsets to obtain a cepstrum of each spectrum subset;
    determining by a carrier identification processor a bin location within the cepstrum having a maximum bin magnitude across all of the plurality of spectrum subsets;
    determining by the carrier identification processor whether the maximum bin magnitude at the cepstrum bin location exceeds a predetermined threshold; and
    issuing by the carrier identification processor an alert that a multi-carrier signal has been sensed in the spectrum sample in response to determining that the maximum bin magnitude at the cepstrum bin location exceeds the predetermined threshold, wherein the cepstrum bin location of the maximum bin magnitude indicates a sub-carrier spacing of the multi-carrier signal when it is determined that the maximum bin magnitude exceeds the predetermined threshold.

9. The method of claim 8 further comprising
    identifying a spectrum subset in which the cepstrum bin location having the maximum bin magnitude exceeding the predetermined threshold is sensed; and
    using the identified spectrum subset to determine a location of the sensed multi-carrier signal within the spectrum sample.

10. The method of claim 8 further comprising identifying a type of multi-carrier signal from the sub-carrier spacing.

11. The method of claim 8, wherein the multi-carrier signal is selected from the group consisting of an Orthogonal Frequency-Division Multiplex (OFDM) signal, a Wi-Fi (802.11a/g/n) signal, a WiMAX signal, an LTE signal, and a Discrete Multi Tone (DMT) signal.

12. The method of claim 8, further comprising issuing by the carrier identification processor an alert that a multi-carrier signal has not been sensed in the spectrum sample in response to determining that the maximum bin magnitude at the cepstrum bin location does not exceed the predetermined threshold.

13. The method of claim 8, wherein the multi-carrier signal has a minimum sub-carrier spacing.

14. The method of claim 13, further comprising issuing by the carrier identification processor an alert that a multi-carrier signal having the minimum sub-carrier spacing has not been sensed in the spectrum sample in response to determining that the maximum bin magnitude at the cepstrum bin location does not exceed the predetermined threshold.

15. The method of claim 13, further comprising issuing by the carrier identification processor an alert that a multi-carrier signal having the minimum sub-carrier spacing has been sensed in the spectrum sample in response to determining that the maximum bin magnitude at the cepstrum bin location exceeds the predetermined threshold.

16. A processor-implemented method for sensing a presence of a multi-carrier signal with equidistant sub-carriers having a known sub-carrier spacing and a known spectrum bandwidth in a spectral sample, the method comprising:
   obtaining by a spectrum collection system a spectrum sample, wherein the spectrum sample is larger than a known signal spectrum bandwidth;
   obtaining by a cepstrum processor from the spectrum sample a plurality of spectrum subsets, wherein each spectrum subset in the plurality of spectrum subsets has a bandwidth that is approximately equal to the known signal spectrum bandwidth;
   transforming by the cepstrum processor each of the plurality of spectrum subsets to obtain a magnitude of a particular cepstrum bin location within each spectrum subset, wherein the particular cepstrum bin location corresponds to the known sub-carrier spacing;
   determining by a carrier identification processor whether the bin magnitude at the particular cepstrum bin location of any of the spectrum subsets in the plurality of spectrum subsets exceeds a predetermined threshold; and
   issuing by the carrier identification processor an alert that the multi-carrier signal having the known sub-carrier spacing and the known spectrum bandwidth has been sensed in the spectrum sample in response to determining that the bin magnitude at the particular cepstrum bin location of any of the spectrum subsets exceeds the predetermined threshold.

17. The method of claim 16, further comprising
   identifying the spectrum subset with a maximum bin magnitude at the particular cepstrum bin location; and
   using the identified spectrum subset to determine a location of the sensed multi-carrier signal within the spectrum sample.

18. The method of claim 16, wherein the multi-carrier signal is selected from the group consisting of an Orthogonal Frequency-Division Multiplex (OFDM) signal, a Wi-Fi (802.11a/g/n) signal, a WiMAX signal, an LTE signal, and a Discrete Multi Tone (DMT) signal.

19. The method of claim 16, further comprising issuing by the carrier identification processor an alert that the multi-carrier signal having the known sub-carrier spacing and the known spectrum bandwidth has not been sensed in the spectrum sample in response to determining that the bin magnitude at the particular cepstrum bin location of any of the spectrum subsets does not exceed the predetermined threshold.

* * * * *